United States Patent [19]

Smyly et al.

[11] Patent Number: 4,554,905
[45] Date of Patent: Nov. 26, 1985

[54] SPACE PROBE/SATELLITE EJECTION APPARATUS FOR SPACECRAFT

[75] Inventors: Harold M. Smyly; Charles D. Miller; Richard A. Cloyd; Clarence Heller, all of Huntsville, Ala.

[73] Assignee: The United States of America as represented by the Administrator of the National Aeronautics and Space Administration, Wshington, D.C.

[21] Appl. No.: 596,959

[22] Filed: Apr. 5, 1984

[51] Int. Cl.⁴ ............................ B64G 1/64; F41B 7/00
[52] U.S. Cl. .................................. 124/56; 244/158 R; 403/328
[58] Field of Search ............... 244/158 R, 159, 165, 244/161, 137 A; 89/1.51, 1.57, 1.58, 1.59, 1.808, 1.54; 102/377, 378, 505; 403/327, 328; 74/2; 293/83; 124/16, 17, 21, 29, 37, 26, 27, 56, 61, 81

[56] References Cited

U.S. PATENT DOCUMENTS

| | | | |
|---|---|---|---|
| 2,933,340 | 4/1960 | McDiarmid | 403/327 |
| 3,059,956 | 10/1962 | Geffner | 244/137 A |
| 3,116,895 | 1/1964 | Mitchum, Jr. | 102/377 |
| 3,380,687 | 4/1968 | Wrench et al. | 244/158 R |
| 3,433,436 | 3/1969 | Mattey | 244/158 R |
| 4,067,308 | 1/1978 | Anderson et al. | 244/158 R |
| 4,239,412 | 12/1980 | Hogan | 403/328 |

FOREIGN PATENT DOCUMENTS 2830945  1/1980  Fed. Rep. of Germany ...... 403/328

*Primary Examiner*—Galen L. Barefoot
*Attorney, Agent, or Firm*—Joseph H. Beumer; John R. Manning; Leon D. Wofford, Jr.

[57] ABSTRACT

An ejection apparatus (19) for spinning and propelling objects (17) for ejection from a spacecraft (11) at a desired velocity and rotational speed. The apparatus includes a launch cradle (23) on which the space object (17) to be ejected rests. The cradle (23) is rotatably supported by a central hub (37) secured to upper end of pneumatic cylinder piston shaft (25). Release mechanisms (29) consisting of a retractable pin (75) and locking lug (72) is utilized to hold the cradle and object to be ejected. The release mechanism (29) has a fixed barrier member (76) which holds the retractable pin (75) in engagement with the locking lug (72) until release by upward movement of the launch cradle (23) beyond the barrier height.

7 Claims, 7 Drawing Figures

4,554,905

SPACE PROBE/SATELLITE EJECTION APPARATUS FOR SPACECRAFT

ORIGIN OF THE INVENTION

The invention described herein was made by employees of the U.S. Government and may be manufactured and used by or for the Government for governmental purposes without the payment of any royalties thereon or therefor.

TECHNICAL FIELD

This invention relates to an apparatus for ejecting space probes, satellites, and the like from a spacecraft, and more specifically to a spin-up and ejection apparatus that its adapted to eject with a significant velocity a spinning payload from a spacecraft such as the orbiter vehicle of the space shuttle. The apparatus includes a retention mechanism that easily disengages from the spinning and accelerating probe or satellite as it leaves the spacecraft. The ejection apparatus may find applications in other technical fields.

BACKGROUND ART

On Apr. 12, 1981, a new era in space flight began as the first reusable space shuttle embarked on its first voyage into space. The plane-like element of the space shuttle is the orbiter that carries the crew and payloads. The payloads may include an object such as a satellite that is to be ejected from the payload bay of the orbiter while in flight.

The apparatus for ejecting these objects from the payload bay of the orbiter obtained their motive force from a compressed spring or springs that eject the object with relative low velocity. The objects in the payload bay were retained before release by a retention mechanism which included a clamp, which clamp was cut to release the spring. For those satellites and probes that are spin stabilized, the entire apparatus including the spring was rotated.

DISCLOSURE OF THE INVENTION

The present invention is a versatile apparatus for spinning and propelling objects from the spacecraft at a desired high velocity and rotational speed. This is accomplished without the use of external arms or catapults, or other complex mechanical devices.

The apparatus includes a launch cradle or platform on which the space probe or satellites to be ejected rests. The cradle is rotatably secured to the upper end of a pneumatic cylinder piston shaft. Pressurizing fluid flows from a supply tank into the pneumatic cylinder forcing the piston and cradle outwardly at a predetermined velocity for ejecting the probe or satellite from the space shuttle payload bay.

A mechanism is provided to hold the probe or satellite securely to the cradle during initial ejection acceleration of the piston and spin-up operation of the cradle, and to release the probe or satellite at the necessary limit of travel of the piston.

Accordingly, it is an object of the present invention to provide an ejection apparatus for space probes or satllite objects from a spacecraft which is capable of high velocity ejections.

Another object is to provide a versatile apparatus which will spin the probe or satellite object at a desired rotational speed when ejected.

A still farther object is to provide a release mechanism for probe or satellite ejection apparatus that will bridge the interface between the ejection mechanism and probe or satellite object that permits separation at the end of a limited ejection movement.

BRIEF DESCRIPTION OF THE DRAWINGS

The invention will be described by referring to the accompanying drawings, in which.

DETAILED DESCRIPTION

Figure 1:
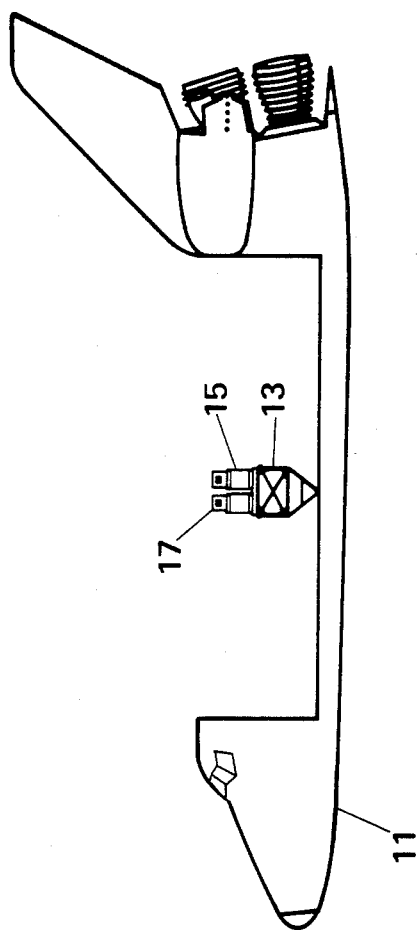
FIG. 1 is a side view of the space shuttle orbiter with payload bay sides removed for illustrating the positioning of the containers containing the ejection apparatus of the present invention in the payload bay.

Referring to the drawings, wherein in FIG. 1 is illustrated a space shuttle orbiter 11 with its payload bay sides removed to reveal a payload pallet 13 holding a plurality of cylindrical containers 15. Upon each container is a probe or satellite 17 object that is to be ejected. The cylindrical containers 13 have therein the ejection apparatus of the present invention for ejecting the probe/satellite object into space as the orbiter circles the earth.

Figure 2:
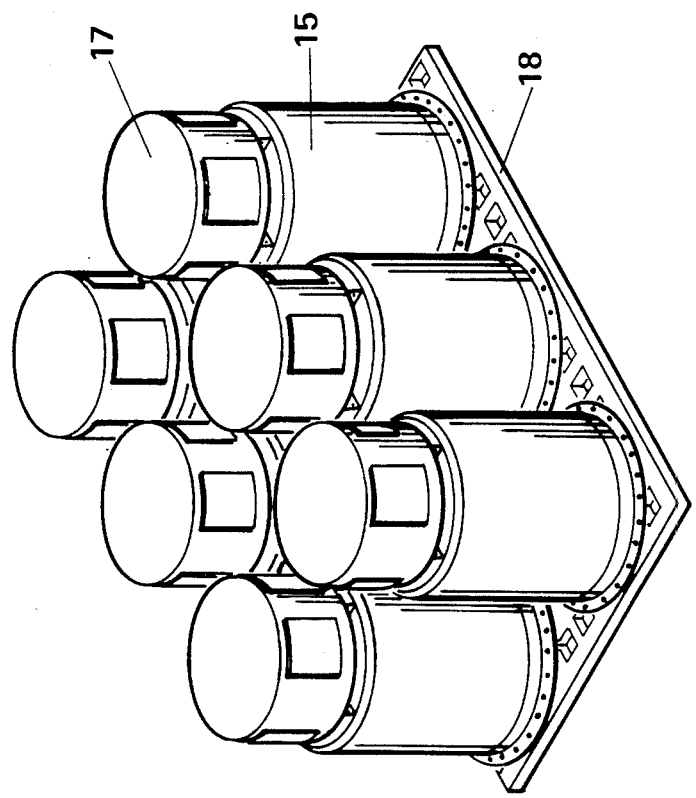
FIG. 2 is a perspective view of a plurality of containers with ejection apparatus and ejectable loads thereon that is placed in the payload bay of the space shuttle orbiter.

FIG. 2 shows in more detail the plurality of containers 15 with their probes/satellites objects 17 secured to a pallet surface 18 of the orbiter.

Figure 3:
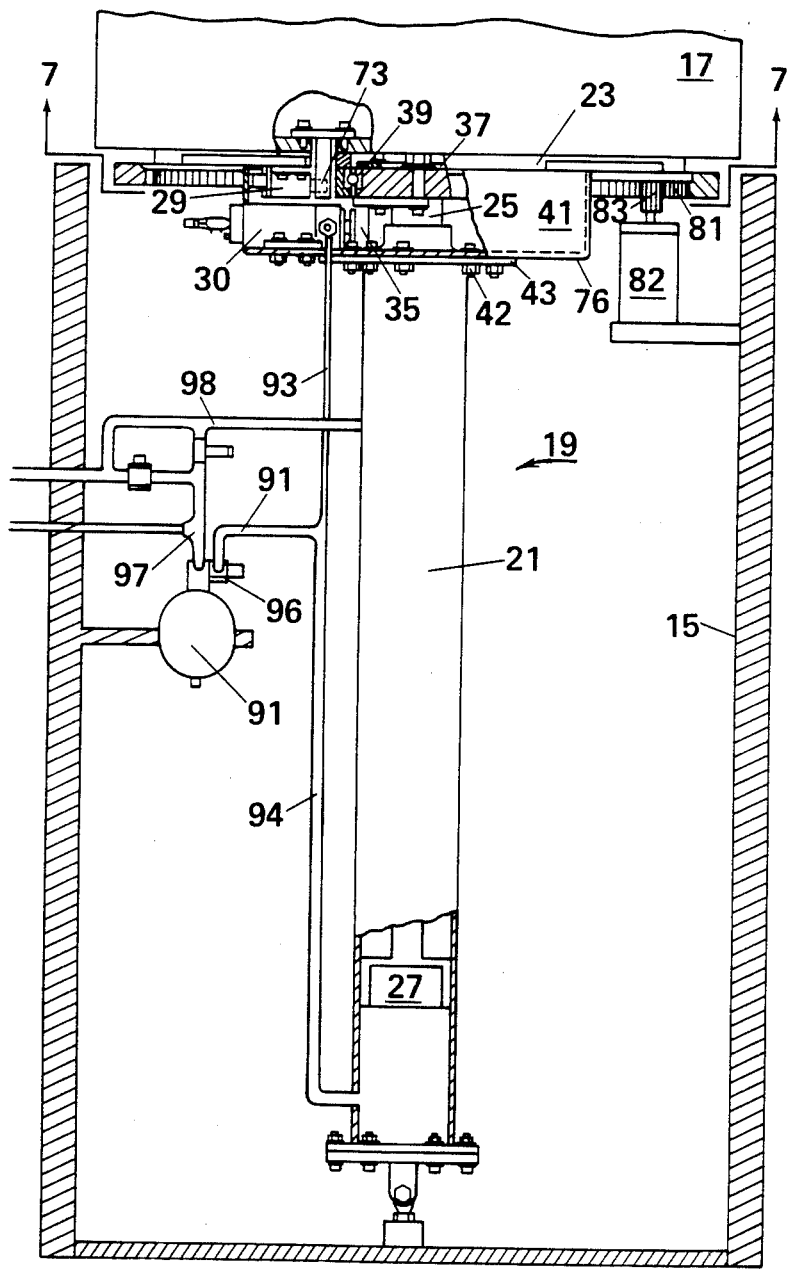
FIG. 3 is a side view of a single container, partly in section, and with parts broken away revealing the nested ejection apparatus.

FIG. 3 partly in section illustrates the ejection apparatus 19 of the present invention that is within a container 15. As shown, the ejection apparatus 19 includes a main pneumatic piston-cylinder 21 having a circular cradle 23 attached to the upper shaft 25 of the piston 27 to which the probe/satellite object 17 is secured by release mechanisms 29, each consisting of a retractable pin and a locking lug as will be described below. The piston 27 is adapted to move upwardly very quickly in response to gas emitted in the cylinder 21 to accelerate the probe/satellite object 17 situated on the top of the cradle 23. Before the end of the stroke of the piston 27, the upper release mechanism 29 releases, allowing the probe/satellite object 17 to be thrown out into space in the direction of the piston travel. A pneumatic operated pin component 30 is used to secure the piston-cylinder shaft 25 before gas is admitted into the cylinder 21.

Figure 4:
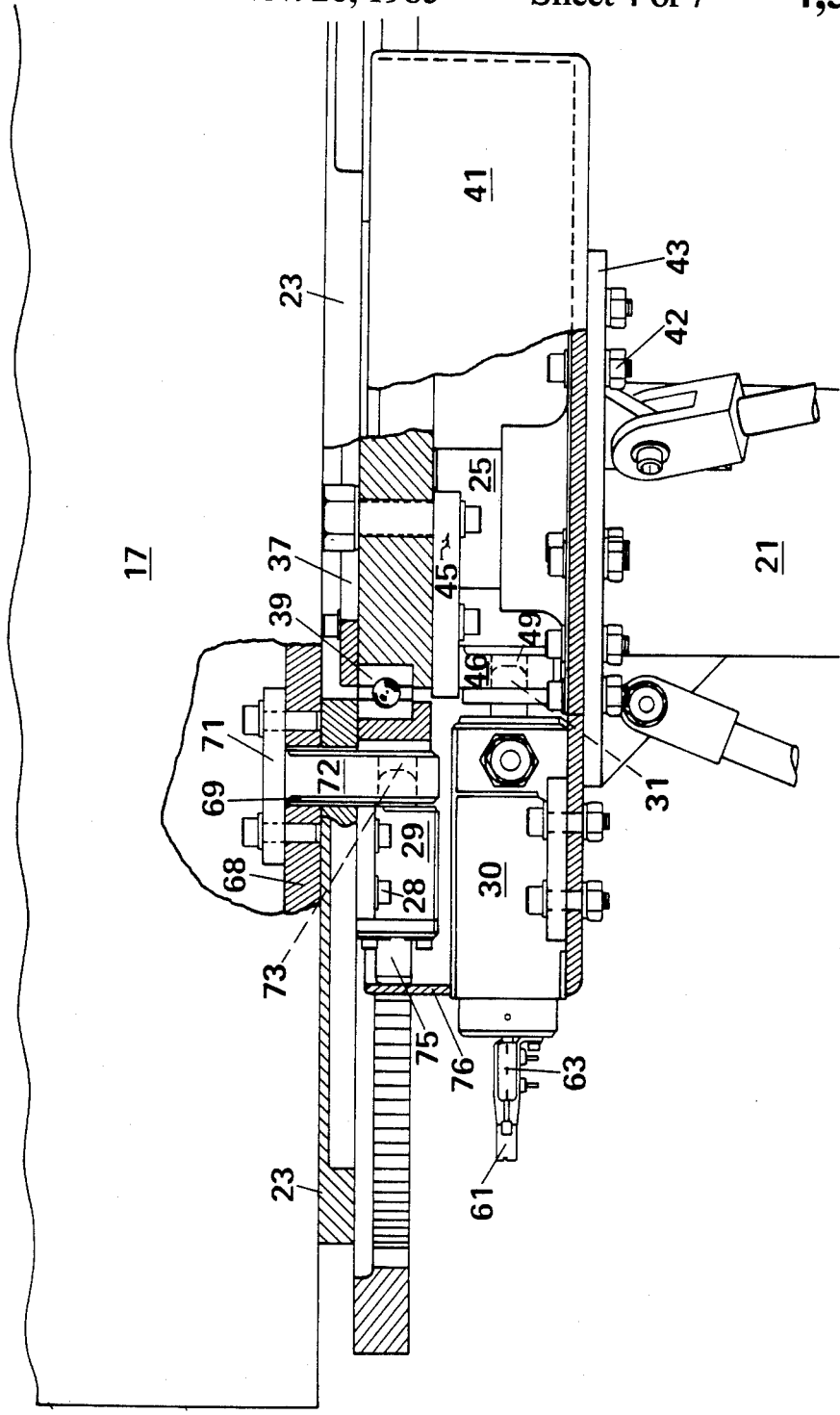
FIG. 4 is a side view partly in section and with parts broken away of release mechanisms between the probe/satellite loads and ejection apparatus.

As illustrated in FIG. 3 and FIG. 4, the circular cradle 23 which fits within the upper opening of the container 13 is adapted to rotate about a circular central hub 37 fastened to the upper or distal end of the piston shaft 25. A circular bearing race 39 is used between the central hub 37 and surrounding 23 cradle. Beneath the central hub 37 is a circular shallow container 41 fastened by bolts 42 to a flange 43 extending from the upper part of the housing for the pneumatic cylinder 21. The bottom of the shallow container 41 has an opening through which the housing of the pneumatic cylinder 21 extends. The pneumatic operated pin component 30 is bolted to the bottom of the shallow container 41 and extends through the side thereof.

Figure 6:
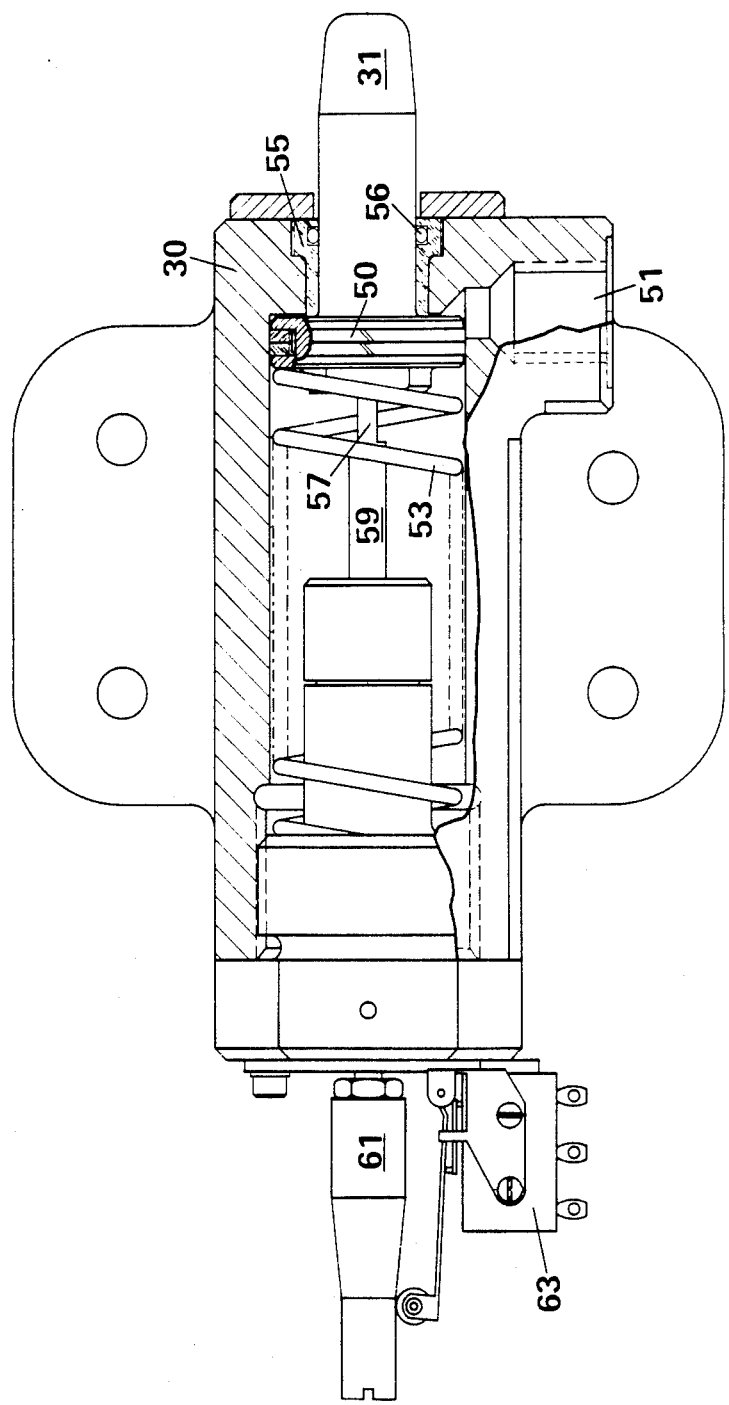
FIG. 6 is a view showing the fluid operated pin retraction component of the release mechanism.

As shown best in FIG. 4, the circular central hub 37 has a bracket 45 bolted to its underside which has a vertical lug 46 extending downwardly. The gas operated pin component 30 has an elongated pin 31 extending through an opening 49 of the vertical lug 46 to prevent the hub 37 from moving upwardly. The gas operated pin component 30 has an internal piston 50 as shown by FIG. 6, which when gas is emitted under pressure at a forward inlet 51 pushes the piston 50 rearwardly against a helical coil spring 53 and thereby retracts the pin 31 from the hub lug opening 49 (FIG. 4). The elongated pin 31 is fastened to the internal piston 50 and extends forwardly through a seal member 55 having an o-ring 56. When the gas pressure is removed, the spring 53 will push the piston 50 forward with its pin 31 reentering the lub opening 49 (FIG. 4) if it is still in position. The piston 50 has a rearwardly extending shaft 57, with an enlargement 59 that extends rearwardly of the housing 30. A cam member 61 on the rear end of the piston shaft 59 activates an electrical follower switch 63 so as to provide a signal of its exact position for ground test purposes. The follower switch 63 is not intended for flight purposes.

Figure 7:
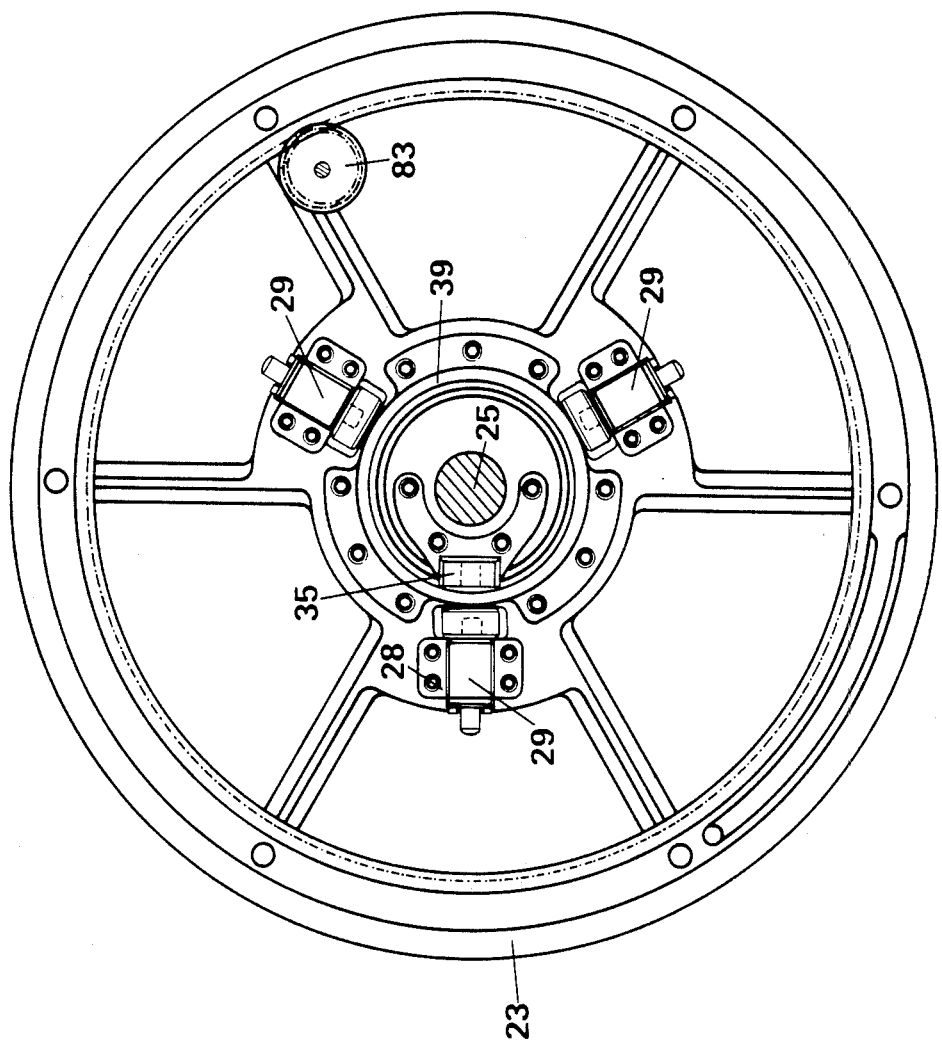
FIG. 7 is a sectional view taken along line 7—7 of FIG. 3 showing the underside of the circular cradle and circular central hub.

Referring again to FIG. 4, there is shown an upper pin component 29 fastened by bolts 28 to the underside of the cradle 23 and positioned generally within the upper space defined by the shallow container 41 secured to the cylinder housing 21. The space probe/satellite object 17 has a bottom mounting plate 68 with three small openings 69 (FIG. 7) extending therethrough. One of the small openings 69 is shown in FIG. 4. Across each opening 69 is a bracket 71 which is bolted to the bottom plate 68. The bracket 71 has a downwardly extending vertical lug 72 having a circular opening 73 adjacent its end adapted to receive the elongated pin 75 from a pin component 29. Thus, it should be apparent that the upper pin components 29 fastened to the underside of the circular cradle 23 holds the probe/satellite object mounting plate 68 to the upper surface of the cradle 23. As shown by the underside view of the cradle 23 in FIG. 7, three pin components 29, equally spaced, are utilized to removably connect with three corresponding lugs 72 of the probe/satellite object 17. Each lug 72 extending from the probe/satellite object 17 is the same as described above.

Figure 5:
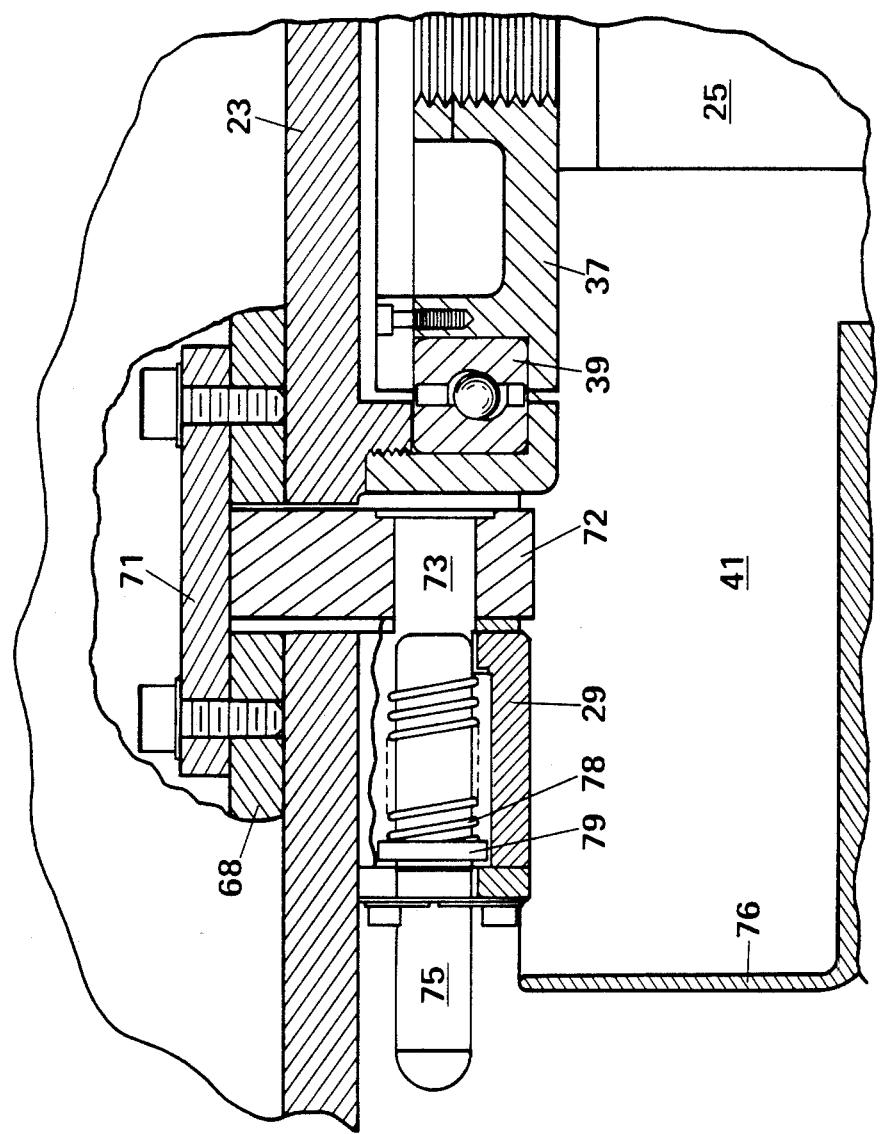
FIG. 5 is a side view similar to FIG. 3 showing the release mechanisms at the instant it releases the probe/satellite load, the lower fluid operated retraction pin component is omitted.

Each upper pin component 29 has a cooperating relationship with the vertical side wall 76 of the shallow container 41 which is explained best by referring both to FIG. 4 and to FIG. 5. In FIG. 5, the pin 75 of the component 29 is shown retracted from the probe/satellite mounting plate lug 72 shortly after the pneumatic cylinder shaft 25 has started the high velocity push that will enable the probe/satelite 17 to be thrown from the cradle 23 into space. This is accomplished by the action of the cradle 23 moving upwardly so that the rear end of the pin 75 which extends rearwardly from the component 29, is free from the upwardly extending side 76 of the container 41 which retains it is position when nested as in FIG. 4, but snaps rearwardly by the action of an internal coiled spring 78 shown in FIG. 5 when it moves away from the vertical side 76 of the container 41 by upward movement of the main central shaft 25. The pin 75 has an outer annular flange 79 acting within the component housing 29 against which the coil spring 79 pushes using the forward part of the internal housing 29 to force the pin 75 to retract when the rear end of the pin 75 becomes clear of the barrier side wall 76 of the shallow container 41. While three automatically retractable components 29 have been shown, it is readily apparent that the number used may depend on the forces encountered.

As illustrated in FIG. 3, the cradle 23 has a circular annular gear track 81 member fastened to its underside adjacent its circular rim edge. The cyclindrical container 15 supports a motor 82 therein which has a pinion gear member 83 on its outer shaft which meshes with the internal gear surface of the track member 81. The motor 82 when switched on will cause the cradle 23 to rotate or spin about the central hub 37 so to enable the probe/satellite object 17 to be ejected while spinning. The upper automatic retracting pins 29 when in a nested condition will have the rear end of their pins rubbing against the barrier surface of the vertical side wall 76 of the shallow container 41 when the cradle rotates 23. This does not interfere with retracting pin's operation and when the cradle 23 is lifted causing the retracting pin component 29 to be clear of the vertical side wall 76 it quickly snaps rearwardly freeing the lug 76 of the bottom plate 68 of the probe/satellite object 17.

The upper surface of the circular cradle 23 extends slightly above the central hub 37 so that when the cradle 23 is rotated the bottom plate 68 of the probe/satellite object 17 will not rub against the upper surface of the central hub 37.

Safety devices not shown may be incorporated into the apparatus described. For example, crushable aluminum honeycomb structure could be placed in the upper portion of the pneumatic cylinder 21 to slow the velocity of the piston 27 near the end of its stroke. Also, a spring-loaded solenoid actuated anti-rotation pin could be used to engage the cradle 23 to prevent its rotation.

FIG. 3 illustrates the compressed gas container 91 and lines 93, 94 for operating the main pneumatic piston-cylinder 21 as well as the fluid operated retractable pin component 30. As shown the gas, nitrogen for example, is stored under pressure in a supply bottle 91 supported within the container 75, and has a main inlet line 93, 94 leading therefrom to the bottom inlet of the main pneumatic cylinder 21 and the forward entry 51 of the fluid operated retractable pin component 30. The inlet line 91 to main inlet lines 93, 94 has a suitable electrical activated valve 96 to emit the gas on signal from the crew members. Depressurization capability is provided by a pyro-actuated vent 97 for abort conditions and an automatic vent after ejection.

A return vent line 98 from the upper portion of the main cylinder 21 is provided to release the buildup of a residual gas within the pneumatic cylinder 21 when the piston 27 is forced upwardly by entry of high pressure gas from the supply bottle 91. The lower supply line 94 to the pneumatic cylinder 21 is longer and of a larger diameter than the upper supply line 93 to the fluid operated retraction pin 30. This enables the gas when released by the valve 96 to reach the fluid retractable pin component 30 before or simultaneously with the gas reaching the main cylinder 21. Thus, the timing of the gas activation of each component helps ensure that the pin holding the center hub 37 is pulled back to release the center hub 37 before the gas starts pushing the pneumatic piston 27 upwardly.

OPERATION

The ejection device is operated when the space shuttle orbiter 11 is at a desired space location for the launch of the probe/satellite object 17. The crew members then activate a signal device (not shown), if the probe/satellite object 17 is to be spin stabilized, starting the motor 82 causing the cradle 23 supporting the probe/satellite object 17 to rotate about the central hub 37 at a desired speed. When the desired rotation speed is reached, the crew members will give the electrical signal to the gas valve 96 causing the release of high pressure gas into the main supply lines 93, 94. The gas upon reaching the retractable pneumatic pin component 30 causes that pneumatic component 30 to retract its pin 31 from the lug 46 attached to the center hub 37. The high pressure gas also activates the main piston 27 causing it to push upwardly within the cylinder 21 the shaft 25. When the piston shaft 25 carries the center hub 37 and surrounding cradle 23 upwardly sufficiently for the automatic retraction pin components 29 to clear the barrier side of the shallow container 41 the retraction pin 75 snaps backwardly from the bottom plate lugs 73 freeing the probe/satellite object 17 from the cradle 23. The entire probe/satellite object 17 and cradle assembly 23 continues to accelerate until the end of the pneumatic piston stroke at which time the probe/satellite object 17 continues to move outwardly so as to be thrown into space.

It is readily apparent that modifications could be made to the ejection apparatus described without departing from the scope of the claim.

What is claimed is:

1. An apparatus for ejecting an object comprising:
   a main cylinder having a piston with a shaft that extends therefrom in response to fluid pressure applied internally of the cylinder said piston moving within the length of the cylinder to extend the shaft a corresponding distance,
   a central hub fastened to the distal end of the shaft of said main cylinder,
   a cradle member rotatably mounted about said central hub, said cradle member adapted to support thereon the object to be ejected,
   release mechanism means for holding said object to said cradle member and for releasing said object from said cradle member after movement of the shaft of said main cylinder from the cylinder for a predetermined distance,
   motor means for rotating said cradle about a central hub,
   said release means comprising a retractable pin means that is adapted to extend within an opening in a lug that extends from the object to be ejected,
   said cradle having an opening which permits a lug from the object to extend through and engage said retractable pin means,
   said retractable pin means secured to said cradle and adapted to retract its pin from the opening of the lug extending from said object after the shaft of said main cylinder has been moved outwardly from said main cylinder a predetermined distance,
   a fluid activated pin component adapted to hold said central hub in a fixed position until activated by fluid pressure at approximately the same time the main cylinder receives fluid pressure so as to release the hub and permit the shaft from the main cylinder to extend,
   a supply container for supplying fluid under pressure to said fluid activated pin component and to said main cylinder,
   a circular barrier member fixed relative to the upper position of said main cylinder from which the shaft extends therefrom,
   said retractable pin means having a pin that contacts at one end said circular barrier member as to be held in a position that engages the downwardly extending lug of the object,
   said retractable pin means being spring loaded so when said cradle to which it is attached is lifted upwardly by the shaft of main cylinder it will clear said barrier and snap back and release the downwardly extending lug of the object.

2. An apparatus according to claim 1 wherein said fluid activated pin means is fixed to said circular barrier member.

3. An apparatus according to claim 2 wherein said circular barrier member is in the shape of a shallow container.

4. A release mechanism comprising:
   a retractable pin means having an elongated pin that is spring loaded to stay in a retracted position,
   said elongated pin having a forward end which when the pin is pushed against the spring load is adapted to be placed in an extended position and engage another member,
   a barrier member which contacts the rear end of said pin and holds said pin in its extended position, but when said pin is moved away from said barrier member will snap back into a retracted position and disengaged from the other member,
   means for moving said retractable pin means away from said barrier member so as to cause said pin to move from an extended position to a retracted position,
   said retractable pin means being fastened to a defined member that is adapted to rotate,
   said barrier being circular so said rear end of the pin will continually contact it as said defined member rotates.

5. An apparatus for ejecting an object, comprising:
   a cradle member adapted to support thereon the object to be ejected,
   means for quickly moving said cradle member from a nested position a predetermined distance along an axis, and then stopping so said object thereon will continue to move outwardly from said cradle member,
   release mechanism for holding said object to said cradle member and for releasing said object from said cradle member after movement of said cradle along said axis a distance shorter than said predetermined distance,
   said release means comprising a retractable pin means attached to said cradle member that is adapted to engage the object to be ejected,
   a fixed barrier member that does not move relative to said cradle member,
   said retractable pin means having a pin that contacts at one end said barrier means when said cradle is in a nested position so as to be held in a position that engages the object to be ejected,
   said retractable pin means being spring loaded so when said cradle to which it is attached is moved along said axis a short distance it will clear said barrier member and snap back disengaging from the object and thus allow it to move outwardly from said cradle member, means for rotating said cradle member, said barrier member being circular so the pin of said retractable pin means will continually contact it as said cradle member rotates until such time it is moved along said axis a sufficient distance to clear the barrier member.

6. An apparatus according to claim 5 further comprising:

said means for quickly moving said cradle member comprising a main cylinder having a piston with a shaft that extends therefrom in response to fluid pressure applied internally of the cylinder, said piston moving within the length of the cylinder to extend the shaft a corresponding distance, a central hub fastened to the distal end of the shaft of said main cylinder.

said cradle member rotatably mounted about said central hub.

7. An apparatus according to claim 6 further comprising:

a fluid activated pin component adapted to hold said hub in a fixed position until activated by fluid pressure at approximately the same time the main cylinder receives fluid pressure so as to release the hub and permit the shaft from the main cylinder to extend, a supply container for supplying fluid under pressure to said fluid activated pin component and to said main cylinder, supply lines from said supply container to said fluid activated pin component and to said main cylinder, said supply lines having different lengths and diameters to enable the actuation of said fluid activated pin component and said main cylinder at approximately the same time.

* * * * *